United States Patent [19]

Pachaly et al.

[11] Patent Number: 5,476,916
[45] Date of Patent: Dec. 19, 1995

[54] PROCESS FOR PREPARING POLYDIMETHYLSILOXANES

[75] Inventors: Bernd Pachaly, Burghausen; Gerhard Nagy, Ranshofen; Wolfgang Jacques; Robert Christa, both of Burghausen, all of Germany

[73] Assignee: Wacker-Chemie GmbH, Munich, Germany

[21] Appl. No.: 345,090

[22] Filed: Nov. 29, 1994

[30] Foreign Application Priority Data

Dec. 16, 1993 [DE] Germany .......... 43 43 033.3

[51] Int. Cl.[6] .................................. C08G 77/06
[52] U.S. Cl. .......... 528/12; 556/452; 556/459; 556/450; 556/466
[58] Field of Search .............. 528/12; 556/452, 556/459, 450, 466

[56] References Cited

U.S. PATENT DOCUMENTS

| | | | |
|---|---|---|---|
| 2,483,963 | 10/1949 | Barry et al. | 260/448.2 |
| 3,903,047 | 9/1975 | Ashby | 528/12 |
| 4,032,557 | 6/1977 | Spörk et al. | 528/10 |
| 4,096,160 | 6/1978 | Ashby | 260/448.2 E |
| 4,395,563 | 7/1983 | Hayes | 556/459 |
| 5,169,970 | 12/1992 | Ohkawa | 556/459 |

FOREIGN PATENT DOCUMENTS

| | | |
|---|---|---|
| 0515082 | 11/1992 | European Pat. Off. . |
| 2348939 | 11/1977 | France . |
| 2518099 | 6/1983 | France . |
| 2104906 | 3/1983 | United Kingdom . |
| 2112407 | 7/1983 | United Kingdom . |

OTHER PUBLICATIONS

"Encyclopedia of Polymer Science and Technology" by H. K. Lichtenwalner and M. N. Sprung, vol. 12, 1970, John Wiley & Sons, Inc.

"Chemistry and Technology of Silicones" by W. Noll, Academic Press.

Primary Examiner—John C. Bleutge
Assistant Examiner—Margaret W. Glass
Attorney, Agent, or Firm—Martin Connaughton

[57] ABSTRACT

The present invention describes a process wherein dimethyldichlorosilane is reacted, in a first step, with water present in hydrochloric acid to give a crude hydrolysate comprising cyclic and linear, chlorine-containing polydimethylsiloxanes and gaseous hydrogen chloride and, in a second step, the crude hydrolysate is treated with steam to reduce the chlorine content and form hydrochloric acid, with the hydrochloric acid formed in the second step being used in the first step.

6 Claims, 1 Drawing Sheet

PROCESS FOR PREPARING POLYDIMETHYLSILOXANES

FIELD OF INVENTION

The present invention relates to a process for preparing polydimethylsiloxanes from dimethyldichlorosilane using a deficiency of water for simultaneously obtaining gaseous hydrogen chloride.

BACKGROUND OF INVENTION

The preparation of silicone oils or silicone rubber is carried out by polymerization of cyclic or linear polydimethylsiloxane intermediates which are produced by hydrolysis and polycondensation of dimethyldichlorosilane. The industrial hydrolysis processes are carried out continuously, as is described in H. K. Lichtenwalner and M. M. Sprung, Encyclopedia of Polymer Science, Vol. 12, Wiley & Sons, New York, 1970. The basic reaction proceeds according to the equation

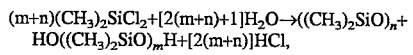

$$(m+n)(CH_3)_2SiCl_2 + [2(m+n)+1]H_2O \rightarrow ((CH_3)_2SiO)_n + HO((CH_3)_2SiO)_mH + [2(m+n)]HCl,$$

forming a complex mixture of cyclic and linear siloxanes. Hydrochloric acid is used as source of the water of reaction required for hydrolysis. The hydrogen chloride formed during hydrolysis is reacted with methanol to give chloromethane and is again used in the synthesis of dimethyldichlorosilane by the direct synthesis process.

In principle, the hydrolysis of dimethyldichlorosilane can be carried out in two ways, which are described in W. Noll, Chemistry and Technology of Silicones, Academic Press, Orlando 1968, chapter 5.1.1. Process variant A is hydrolysis using an excess of water. In this, the water available is regulated in such a way that hydrochloric acid is formed. The crude hydrolysate generally contains 20% to 50% of cyclic and 20% to 80% of linear polydimethylsiloxanes having OH end groups. Process variant B is hydrolysis using a deficiency of water. This gives a crude hydrolysate in which the linear siloxane components have Cl at the ends.

The two process variants A and B differ in the way in which the gaseous hydrogen chloride is obtained. In variant A, azeotropic hydrochloric acid (21% by weight) is circulated, brought to saturation concentration (37% by weight) by hydrolysis of the dimethyldichlorosilane and hydrogen chloride is obtained by distillation. For further processing, the crude hydrolysate has to be freed of amounts of remaining hydrochloric acid. In variant B, the hydrogen chloride is obtained directly in dry and gaseous form. Variant B is thus superior to variant A, but has the disadvantage that a part of the chlorine is lost via the Cl-terminated crude hydrolysate. For further processing, the crude hydrolysate has to be neutralized giving a large amount of acid waste water, i.e., very dilute hydrochloric acid, which has to be discarded. This loss via the acid waste water is unavoidable because scrubbing to neutrality of the Cl-terminated crude hydrolysate cannot be successfully carried out with the limited amount of water which would make possible recirculation of the entire scrubbing acid as water of reaction to the hydrolysis process. The reason for this is that, in the scrubbing process, the polycondensation of the OH-terminated linear siloxane components formed from the Cl-terminated linear siloxane components with a limited amount of water proceeds so rapidly that the resulting mean molecular weight of the neutralized crude hydrolysate is too high for further processing, for example, it exceeds a viscosity of 60 cst. The polycondensation occurs in the scrubbing process if there results an aqueous hydrochloric acid, which accelerates the reaction, in contact with the siloxane phase.

SUMMARY OF INVENTION

It is the object of the present invention to provide a process for preparing low-viscosity polydimethylsiloxanes from dimethyldichlorosilane with simultaneous recovery of gaseous hydrogen chloride in which the losses of hydrogen chloride in the form of acid waste water are as small as possible.

The present invention provides a process for preparing polydimethylsiloxanes which comprises in a first step, reacting dimethyldichlorosilane with water present in hydrochloric acid to give a crude hydrolysate comprising cyclic and linear, chlorine-containing polydimethylsiloxanes and gaseous hydrogen chloride and in a second step, treating the crude hydrolysate with steam to reduce the chlorine content and form hydrochloric acid, where the hydrochloric acid formed in the second step is used in the first step.

The process of the invention can be controlled in such a way that relatively small amounts of hydrogen chloride, if any, are lost via the waste water.

The crude hydrolysate formed in the first step comprises cyclic, Cl-terminated and possibly OH-terminated polydimethylsiloxanes, in which preferably at most 10% by weight, in particular 1% by weight, of the linear polydimethylsiloxane end groups are OH groups.

The pressure in the first step can be selected in such a way that mechnical compression of the hydrogen chloride gas obtained is unnecessary for it to be directly used in other processes. The pressure is preferably from 0.15 to 0.5 MPa, in particular from 0.25 to 0.35 MPa. The conventional mechanical compression of hydrogen chloride is very complicated since the removal of impurities, in particular of water, is necessary to protect the compressors against corrosion. For example, the hydrogen chloride which is under pressure can be reacted with methanol to prepare chloromethane which in turn is used in the methylchlorosilane synthesis. The major part of the chlorine can thus be circulated without being discharged into the environment.

In the second step, the chlorine content of the polydimethylsiloxanes is extracted. The viscosity of the polydimethylsiloxanes in the crude hydrolysate is barely increased by the use of the same amount of water in the form of steam, in contrast to the known use of water in liquid form. Less water is thereby required in the second step for the preparation of low-viscosity polydimethylsiloxanes. It is therefore possible to produce a concentrated hydrochloric acid of which a large amount, preferably at least 50%, in particular at least 90%, can be used again in the first step, being completely converted into gaseous hydrogen chloride and crude hydrolysate and thereby being consumed.

The concentrated hydrochloric acid can also be used for other purposes.

In a particularly preferred embodiment, the amount of water used in the second step is at most such that the water in the hydrochloric acid formed is completely reacted in the first step.

The second step of the process of the invention is preferably carried out at a temperature of from 110° C. to 160° C.

The treatment of the crude hydrolysate in the second step can be carried out by passing in the steam in cocurrent or countercurrent mode. The treatment is preferably carried out in a column, for example in a packed or stripping column.

For the preparation of polydimethylsiloxanes having a particularly low chlorine content, the treatment with steam can also be carried out in two or more stages. For example, a part of the steam can be fed into the second stage, in which only small amounts of hydrogen chloride are obtained, and the other part of the steam can be fed into the first stage. The acid water obtained in the second stage can be used again in part, if the hydrochloric acid obtained in the first stage is insufficient, in the first step of the process of the invention. In a further embodiment, the entire amount of steam is fed into the second stage, with a part of the hydrogen chloride-containing steam obtained in the second stage being fed into the first stage. The hydrogen chloride-containing steam obtained in the second stage together with the hydrochloric acid obtained in the first stage can here by used again, if desired in part, in the first step of the process of the invention.

To prepare polydimethylsiloxanes having a particularly low chlorine content, a further treatment using a base such as sodium hydroxide solution, aqueous sodium carbonate or ammonia can also be carried out in one stage.

The process of the invention can be carried out batchwise, semi-continuously or fully continuously, with preference being given to using the fully continuous mode of operation for both steps, for example in a loop reactor, in particular in an integrated installation.

In one embodiment, the polydimethylsiloxanes are treated together and are separated into high-volatility and low-volatility polydimethylsiloxanes only after extraction of the chlorine content in the second step.

In another embodiment, the high-volatility polydimethylsiloxanes are separated off after the first step, for example before the second step and/or after the various stages of the second step, and, if desired, again introduced into the reactor of the first step of the process of the invention. This embodiment is preferred for preparing low-volatility polydimethylsiloxanes, in particular the separation of the high-volatility polydimethylsiloxanes after the various stages of the second step and their re-circulation to the reactor of the first step. The preparation of only high-volatility polydimethylsiloxanes can be carried out in a similar manner. FIG. 1 shows a preferred embodiment of the process of the invention:

DESCRIPTION OF DRAWING

Dimethyldichlorosilane is fed via line (1) into the loop reactor (3) and hydrochloric acid is fed in via line (2). In this reactor, there are produced gaseous hydrogen chloride which is conducted away via line (4) and the crude hydrolysate which is fed via line (5) to the top of the column (6). In the column (6), the crude hydrolysate is treated in countercurrent with steam which is fed into the column (6) via line (7). Column (6) represents the first stage of the second step of the process of the invention. The mixture of high-volatility polydimethylsiloxanes in vapor form, water and hydrogen chloride leaving the top of the column (6) is condensed and fed via line (8) into a separator (9). There the high-volatility polydimethylsiloxanes and hydrochloric acid are separated. The high-volatility polydimethylsiloxanes are conducted away via line (10). The hydrochloric acid is fed into the loop reactor (3) via line (2). At the bottom of the column (6), the treated polydimethylsiloxanes are drained via line (11) or fed in via line (12) at the top of the column (13). In the column (13), the crude hydrolysate is treated in countercurrent with steam which is fed in via line (14). Column (13) represents the second step of the process of the invention. The mixture of high-volatility polydimethylsiloxanes in vapor form, water and hydrogen chloride leaving the top of the column (13) is condensed and fed via line (15) into a separator (16). There polydimethylsiloxanes and acid water are separated. The high-volatility polydimethylsiloxanes are conducted away via line (17). The acid water is drained via line (18). At the bottom of the column (13), the treated polydimethylsiloxanes are drained via line (19).

EXAMPLE 1

First Step According to the Invention

Figure 1:
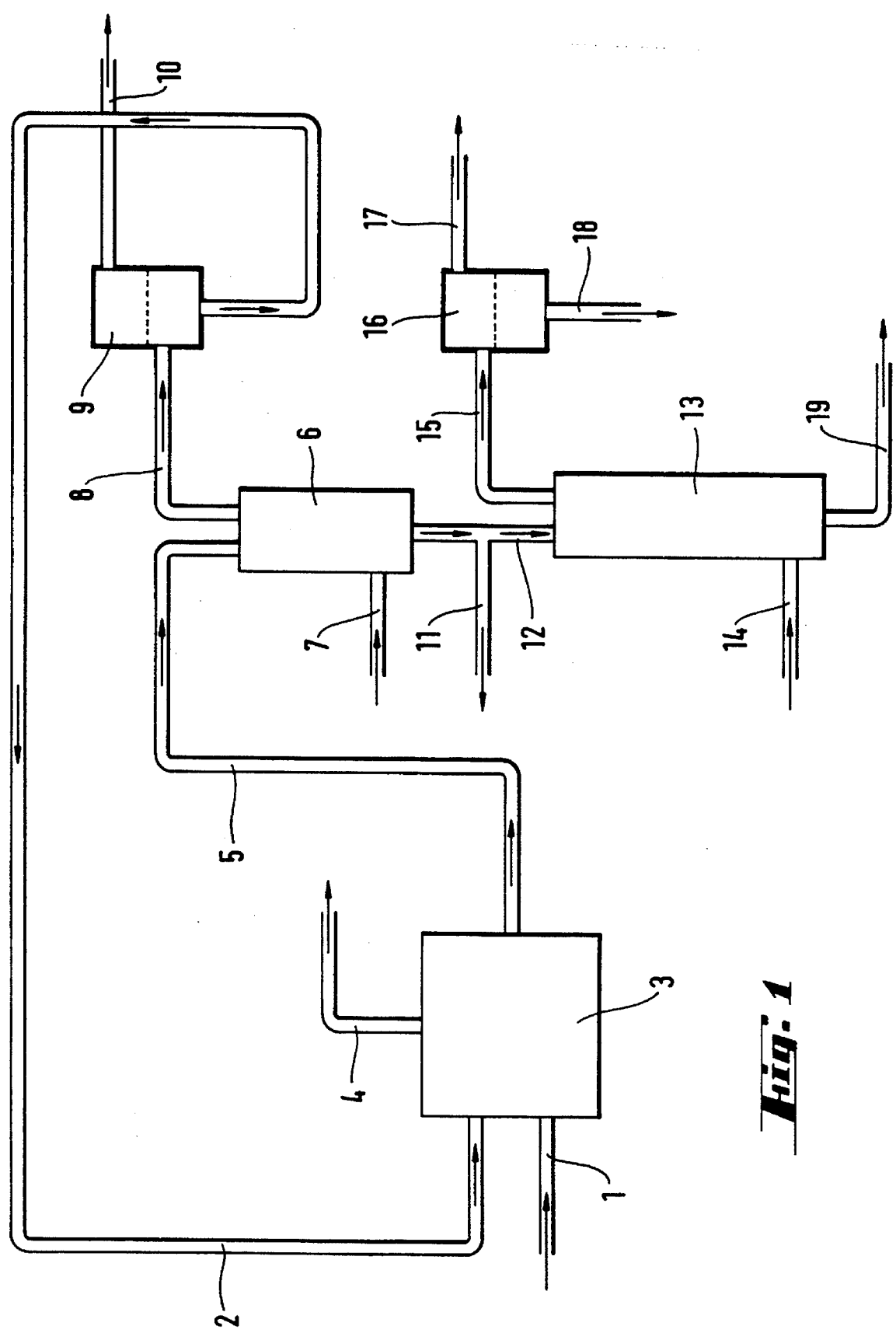

In a hydrolysis facility for hydrolyzing dimethyldichlorosilane with a deficiency of water, there is produced a crude hydrolysate which contains about 50% by weight of cyclic and 50% by weight of linear, Cl-terminated polydimethylsiloxanes. The chlorine content of the polydimethylsiloxanes was 60 g/kg of siloxane, the viscosity was 5 mPa·s. For the preparation of 3500 kg of crude hydrolysate, 860 kg of hydrochloric acid having a strength of about 25% by weight were used as the only water source. The hydrogen chloride obtained was conducted away in gaseous form at a pressure of about 0.3 MPa.

EXAMPLE 2

Second Step not According to the Invention; Recovery of HCl via Scrubbing Process 3500 kg/h of the crude hydrolysate prepared in Example 1 were together with 750 kg/h of water fed into a scrubbing loop reactor at 110° C. The product mixture leaving the reactor was separated in a gravity separator into a siloxane phase and a water phase. This gave 3390 kg/h of siloxane having a Cl content of 2 g/kg of siloxane and a viscosity of 100 mPa·s and also 860 kg/h of hydrochloric acid having a strength of about 25%. The hydrochloric acid was completely used again in Example 1.

EXAMPLE 3

Second Step According to the Invention; Recovery of HCl by Means of Steam Extraction 3500 kg/h of the crude hydrolysate prepared in Example 1 were fed in at the top of a packed column and 750 kg/h of steam at 130° C. were passed in countercurrently. The mixture of gaseous siloxane components, water and hydrogen chloride leaving the top of the column was condensed in a flow-through condenser and separated in a gravity separator into a siloxane phase and a water phase. After combining the condensed siloxane phase from the top of the column with the siloxane stream leaving the bottom, there were obtained 3390 kg/h of siloxane having a Cl content of 2 g/kg of siloxane and a viscosity of 30 mPa·s and also 860 kg/h of a 25% strength hydrochloric acid. This hydrochloric acid was completely used again in Example 1.

EXAMPLE 4

Second Step According to the Invention; Recovery of HCl by Means of Two-stage Steam Extraction In a two-stage packed column, 3500 kg/h of crude hydrolysate as described in Example 1 was fed in at the top of the first stage and 750 kg/h of steam at 130° C. were fed in in the lower part of the first stage. The mixture of gaseous siloxane components, water and hydrogen chloride leaving the top of the first stage was condensed and separated in a gravity separator into a siloxane phase and a water phase. At the bottom of the first stage, there were obtained 2860 kg/h of siloxane containing 2.4 g/kg of chlorine and this was fed into the second stage of the column. In the lower part of the second stage, 1500 kg/h of steam at 130° C. were passed in in counter current. At the top of the second stage, volatile siloxane components, water and hydrogen chloride were drawn off, condensed and separated in a gravity separator into siloxane and water phases. This gave about 1500 kg of waste water having an HCl content of 3 to 4 g/kg. All siloxane streams were combined, giving 3390 kg/h of siloxane having a chlorine content of less than 1 mg/kg.

What is claimed is:

1. A process for the hydrolysis of dimethyldichlorosilane to form polydimethylsiloxanes, comprising:
   a) hydrolyzing dimethyldichlorosilane with aqueous hydrochloric acid containing an amount of water less than the stoichiometric amount calculated on the basis of hydrolyzable chlorine in said dimethyldichlorosilane to form a hydrolysate comprising cyclic polydimethylsiloxanes and chlorine-containing linear polydimethylsiloxanes;
   b) separating gaseous hydrogen chloride generated during said hydrolysis from said hydrolysate to form a crude polydimethylsiloxane hydrolysate;
   c) treating said crude polydimethylsiloxane hydrolysate with steam to reduce the chlorine content of chlorine-containing linear polydimethylsiloxanes contained in said crude polydimethylsiloxane hydrolysate and form hydrochloric acid;
   d) recycling the hydrochloric acid from step c) to a further hydrolysis of dimethyldichlorosilane as defined in step a);

wherein the amount of water supplied as steam in step c) is such that the hydrochloric acid recycled in step d) contains a deficiency of water with respect to dimethyldichlorosilane in step a).

2. The process as claimed in claim 1, wherein the pressure of the hydrogen chloride gas obtained in step a) is from 0.15 to 0.5 MPa.

3. The process as claimed in claim 1, wherein the amount of water supplied as steam in step c) is at most such that the water contained in the hydrochloric acid formed in step b) and recycled to step a) is completely reacted with dimethyldichlorosilane in step a).

4. The process as claimed in claim 1, wherein said treating of said crude polydimethylsiloxane hydrolysate in step c) is carried out in a column.

5. The process as claimed in claim 1, where said treating of said crude polydimethylsiloxane hydrolysate with steam in step c) comprises two or more successive stages, each successive stage of said two or more successive stages generating a polydimethylsiloxane product containing less chlorine than contained in the polydimethylsiloxane product of the preceding stage.

6. The process as claimed in claim 1, wherein said process is a continuous process.

* * * * *